United States Patent [19]

Opheij et al.

[11] Patent Number: 4,918,679
[45] Date of Patent: Apr. 17, 1990

[54] OPTICAL RECORD CARRIER SCANNING APPARATUS PROVIDING OPTOELECTRONIC POSITIONING OF THE SCANNING SPOT

[75] Inventors: Willem G. Opheij; Louis-Marie H. Cobben, both of Eindhoven, Netherlands

[73] Assignee: U.S. Philips Corporation, New York, N.Y.

[21] Appl. No.: 173,914

[22] Filed: Mar. 28, 1988

[30] Foreign Application Priority Data

Jan. 21, 1988 [NL] Netherlands .................. 8800133

[51] Int. Cl.$^4$ ............................................. G11B 7/00
[52] U.S. Cl. ....................................... 369/44; 369/112
[58] Field of Search .................. 358/342; 369/43–47, 369/112; 250/201

[56] References Cited

U.S. PATENT DOCUMENTS 3,985,952 10/1976 Adler .................................. 369/44

*Primary Examiner*—Robert L. Richardson
*Attorney, Agent, or Firm*—Algy Tamoshunas; Leroy Eason

[57] ABSTRACT

Optical record carrier scanning apparatus including a source of radiation which is tunable to produce different wavelengths of a radiation beam and an optical assembly for forming the radiation beam into a spot for scanning information tracks on the record carrier. The optical assembly includes a diffraction grating which diffracts the beam so that only a selected diffraction order sub-beam thereof is formed into the scanning spot, the diffraction angle of such sub-beam and consequently the position of the scanning spot relative to the track being scanned being variable by variation of the wavelength of the radiation beam. A periodic transverse variation of spot position can thus be produced entirely optoelectronically, for producing a tracking error signal to control the scanning spot to remain centered on the information track.

17 Claims, 5 Drawing Sheets

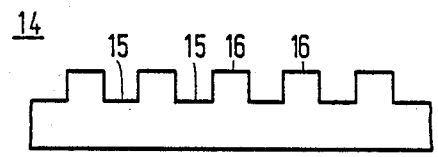
FIG.4
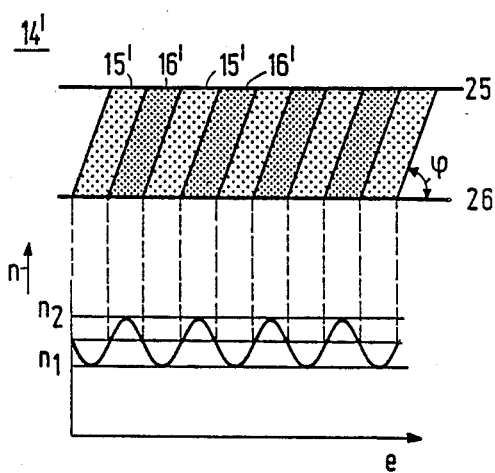
FIG.5
FIG.5a
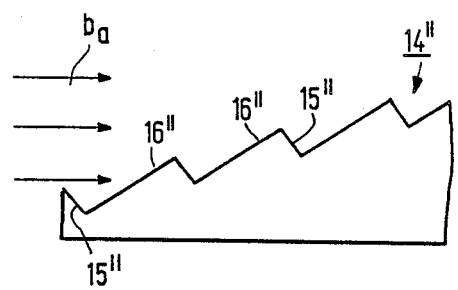
FIG.6

OPTICAL RECORD CARRIER SCANNING APPARATUS PROVIDING OPTOELECTRONIC POSITIONING OF THE SCANNING SPOT

BACKGROUND OF THE INVENTION

1. Field of the Invention

The invention relates to an apparatus for optically scanning a recording track of an optical record carrier, said apparatus comprising a radiation source for supplying a scanning beam, and an imaging optical system for imaging the radiation source to form a scanning spot on the recording track.

The recording track may be a track already optically recorded with information, or an optically detectable track in which information is to be written optically. In the first-mentioned case the scanning beam is a read beam and in the second case the scanning beam is a write beam which is intensity-modulated in accordance with the information to be written.

The recording track may be provided on different types of record carriers, such as a tape-shaped or a round disc-shaped record carrier. In the latter case the recording track may be a continuous spiral track comprising a multitude of turns or it may comprise a multitude of separate concentric turns.

2. Description of the Related Art

Examples of the above-mentioned apparatus are a read apparatus for an optical audio or video disc known as "CD" and "Laser-vision" players, respectively, or a combined write and read apparatus for an optical data disc.

In order to achieve that the scanning spot is always correctly positioned with respect to a track portion to be scanned, the optical scanning apparatus of the type described comprise a tracking servo-system. In such a system the position of the centre of the scanning spot with respect to the centre line of the scanned track portion is detected and the position of the scanning spot is corrected in accordance with the tracking error signal obtained.

As described in inter alia U.S. Pat. No. 4,063,287 a tracking error signal may be generated by periodic movement of the scanning spot at a given frequency transversely to the track direction. Due to the periodical displacement of the scanning spot the radiation plane in which the recording track is situated is periodically modulated. As a result, the output signal of a radiation-sensitive detector arranged in the path of the radiation has a periodically varying component whose amplitude and phase, related to the movement of the scanning spot, represent the magnitude and the direction of a deviation of the scanning spot position with respect to the scanned track portion.

In the apparatus described in U.S. Pat. No. 4,063,287 the periodical movement of the scanning spot is produced by means of a mirror arranged in the path of the scanning beam, which mirror is periodically pivoted about an axis which is effectively parallel to the direction of the scanned track portion. The average position of the scanning spot can be corrected by setting, for example, the central or nominal position of this mirror by means of the tracking error signal which has been generated. Such a tracking servo-system, in which moving elements are used, has a limited bandwidth.

SUMMARY OF THE INVENTION

The present invention has for its object to provide a scanning apparatus in which (a) moving element(s) is (are) no longer necessary for correcting the position of the scanning spot with respect to a scanned track portion and/or for generating a tracking error signal.

The apparatus according to the invention is characterized in that a diffraction grating is arranged in the radiation path between the radiation source and the recording track in such a way that only the radiation of a beam diffracted by the grating in a selected higher diffraction order is focused into the scanning spot, and in that the radiation source is constituted by a laser whose wavelength is tunable.

A higher order is understood to mean the first, the second and further higher diffraction orders of the diffraction grating.

The invention utilizes the fact that the angle at which the diffraction grating diffracts the selected-order beam is a function of the wavelength of the scanning beam. By varying this wavelength, the direction of the selected order beam and hence the position of the scanning spot with respect to the recording track can be varied.

A preferred embodiment of the scanning apparatus is characterized in that the radiation source is constituted by a semiconductor diode operating as a monomode diode laser and a semiconductor element optically coupled thereto comprising a light-conducting layer operating as a tuning resonant cavity for the laser radiation.

Such a composite semiconductor device, which is also referred to as "Cleaved-Coupled-Cavity Semiconductor Laser", for use as a radiation source in an optical fibre communication system, is described in, for example, the Article: "Demonstration of Multilevel Multichannel Optical Frequency Shift Keying with Cleaved-Coupled-Cavity Semiconductor Laser" in "Electronics Letters" (1983), Volume 19, no. 9, pages 341–342.

By varying the electric current passed through the second semiconductor element, the refractive index of the light-conducting layer therein and hence the optical path length of the resonant cavity within this element can be varied, so that the composite radiation source is tuned to a different wavelength.

The possibility of varying the direction of the scanning beam electro-optically can be utilized in two ways. The first possibility is utilized in an apparatus which is also characterized in that the control signal for the radiation source is a DC signal whose magnitude and sign are proportional to a tracking error signal, the wavelength of the scanning beam being tuned to an optimum value by means of said DC signal.

The optimum wavelength is the tuned wavelength for which the principal axis of the selected-order beam is directed to the centre line of a track portion to be scanned.

For this embodiment the way in which the tracking error signal is generated is not relevant; various known methods may be used.

A second possibility provided by the present invention is the generation of a tracking error signal. A scanning apparatus providing this possibility is characterized in that the radiation source is coupled to an AC signal source for periodically varying the wavelength of the radiation source with a small amplitude about an average value and in that an opto-electronic detection device is provided for the synchronous detection of radiation from the plane of the recording track by means of a reference signal whose frequency is equal to that of the periodical variation of the wavelength.

Due to this variation of the wavelength about an average value, the diffraction grating moves the selected-order beam periodically to and fro. As a result, the scanning spot moves periodically about an average position transversely to the direction of a scanned track portion. This periodical movement of the scanning spot, which is also referred to as the scanning spot wobble, may be used in the same way as described in the above-mentioned U.S. Pat. No. 4,063,287 for generating a tracking error signal.

The apparatus in which the scanning spot is periodically displaced electro-optically may further be characterized in that the imaging optical system is constituted by a diffraction grating which has a lens action.

Such a grating which has curved grating strips with a varying curvature and a varying grating period instead of straight grating strips and a constant grating period may be constituted, for example, by a holographic grating. This grating ensures imaging sufficiently high quality imaging of the radiation source in the scanning spot. The periodical variation of wavelength required for the small scanning spot wobble has such a small amplitude that there is no unacceptable deterioration of the scanning spot quality.

A preferred embodiment of the scanning apparatus is further characterized in that the diffraction grating is a reflective grating, the angle of incidence between a normal on the grating and the chief ray of the scanning beam being considerably larger than 45° and smaller than 90°.

By using a reflective grating, the height of the scanning apparatus can be reduced, which is particularly important when reading and/or writing disc-shaped optical record carriers. By suitable choice of the diffraction order in combination with a suitable choice of the grating period it is achieved that the diffraction grating for the selected-order beam behaves as a mirror at an angle of 45°, which mirror reflects this beam at an angle of 90° to the incident beam, although the grating is oriented at an angle which is considerably smaller than 45° with respect to the incident radiation beam. This considerably reduces the mounting height of the apparatus.

The scanning apparatus may comprise a radiation source in the form of a diode laser having an active layer emitting a laser beam whose aperture angle in the lateral plane through the principle axis of the beam and parallel to the active layer is smaller than the aperture angle in the transverse plane through the principal axis of the beam and transverse to the active layer. Such scanning apparatus is preferably further characterized in that the grating strips are transverse to such lateral plane.

In such plane the scanning beam is widened by reflection on the grating, and it can be ensured that the lateral width of the beam will be equal to the transverse width, so that the scanning spot is round in spite of the non-round cross-section of the beam emitted by the diode laser.

The above-mentioned scanning apparatus are preferably further characterized in that the diffraction grating is a phase grating. Such a grating has a higher efficiency than an amplitude grating.

In accordance with a further characteristic feature of the scanning apparatus the phase grating is constituted by a profile grating comprising grating grooves alternating with grating strips. Such a grating may be manufactured in bulk quantities at low cost by means of known pressing or replica techniques starting from a grating mould.

The scanning apparatus may alternatively be characterized in that the phase grating is a volume grating comprising juxtaposed strips alternately having a first average refractive index and a second average refractive index.

A volume grating is a so-called thick grating in which the grating structure extends across the thickness of the grating plate and not just on the surface, as is the case with a "thin" grating. An example of the volume grating referred to is a so-called volume hologram grating. This is a special type of diffraction grating which is obtained by causing two radiation beams extending at a given angle to each other to be incident on a thick plate of special photographic material. These beams produce in the plate a depth interference pattern of strips alternately having a high and a low intensity. The photographic material is chosen to be such that after development the two exposure levels are converted into different refractive indices. A very high efficiency can be achieved with such a volume hologram.

In order to limit as much as possible the radiation loss which is inherent in the use of a diffraction grating and is caused by the distribution of the radiation over the different diffraction orders, the scanning apparatus is further characterized in that the grating parameters determining the intensity distribution over the different diffraction orders are chosen to be such that a maximum percentage of the incident radiation intensity is in the selected diffraction order.

In the case of a profile grating the said parameters are the ratio between the width of the grating grooves and those of the grating strips, the depth of the grating grooves and the edge steepness of these grooves. A grating which is optimized for a given diffraction order is referred to as a "blazed" grating in the literature. Such a grating often has a sawtooth-shaped profile without any portions which are transverse to the direction of incidence.

In the case of a volume hologram the parameters determining the intensity distribution are the ratio between the width of the strips with the first refractive index and those of the strips with the second refractive index, the ratio of the refractive indices, the thickness of the strips and the angle at which these strips extend to the direction of incidence in the plane transversely to the longitudinal direction of the grating strips.

The scanning apparatus may be further characterized in that a sub-beam diffracted in one of the first diffraction orders is focused into the scanning spot. The first-order diffracted sub-beams have of themselves a higher intensity than the higher diffraction orders, without optimization of the grating for this order. Due to such optimization one of the first-order sub-beams may be intensified at the cost of the sub-beams of the other orders.

The possibility of optimizing the grating for a second or higher diffraction order is advantageously utilized in another embodiment of the scanning apparatus which is characterized in that a second or higher order sub-beam is focused into the scanning spot.

If the selected sub-beam has an identical diffraction angle the period of the diffraction grating can be increased, which facilitates the manufacture of the grating with the required accuracy. If the grating period remains the same, the angle of incidence of the beam can be increased so that the height of the scanning apparatus can be still further reduced.

To facilitate handling and positioning of the diffraction grating, a further embodiment is characterized in that the diffraction grating is arranged on the oblique side of a triangular prism having a straight angle, the other two sides of which are perpendicular to the incident beam and to the beam directed towards the recording track, respectively.

BRIEF DESCRIPTION OF THE DRAWINGS

The invention will now be described in greater detail, by way of example, with reference to the accompanying drawings in which FIGS. 4, 5, 5a and 6 show embodiments of a phase diffraction grating.

DESCRIPTION OF THE PREFERRED EMBODIMENTS

Figure 1:
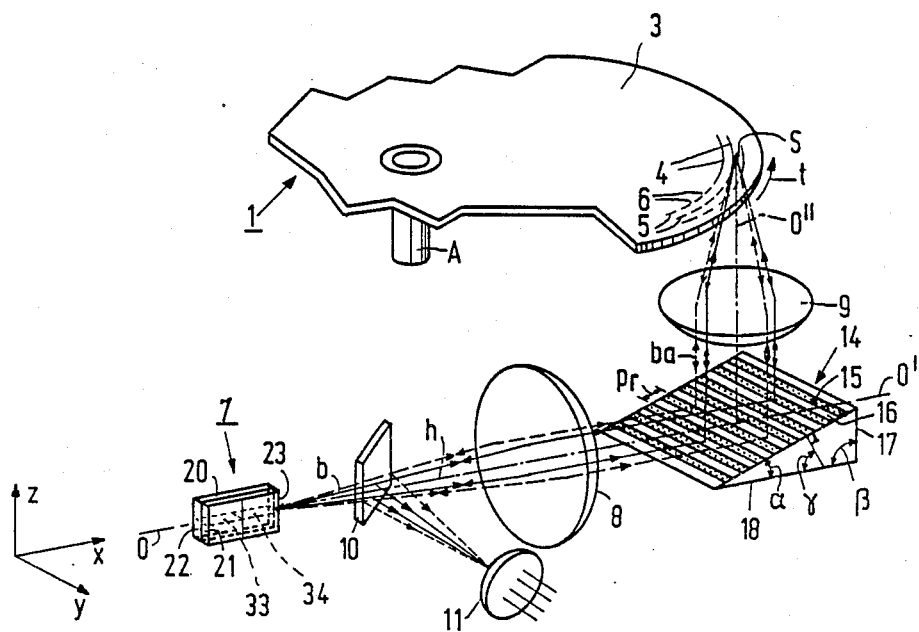
FIG. 1 is a diagrammatic perspective view of an embodiment of an apparatus for reading a disc-shaped optical record carrier with a turntable radiation source and a diffraction grating.

FIG. 1 shows a part of a round disc-shaped record carrier 1. The information structure is indicated by the information tracks 4 located in an information plane 3 and comprising a series of information areas 5 alternating with intermediate areas 6 in the track direction t. The information structure is preferably provided in the upper surface of the record carrier and is read by a scanning beam b passing through the underlying substrate. The scanning beam is supplied by a radiation source 7, for example, a semiconductor diode laser.

The scanning beam b is focused by an objective 9 to form a scanning spot S in the information plane. A collimator lens 8 is arranged between this objective and the diode laser, which lens converts the diverging beam emitted by the diode laser into a parallel beam having such a cross-section that the pupil of the objective is adequately filled so that the scanning spot S is diffraction-limited and has a minimum diameter. The read beam is reflected by the information surface and, if the record carrier is rotated by means of the driving shaft A, it is modulated in conformity with the information stored in a track 4 to be read.

The radiation path incorporates a beam splitter 10, for example, in the form of a semi-transparent mirror which passes the beam b emitted by the radiation source 7 to the objective and reflects the modulated beam from the record carrier to a radiation-sensitive detection system 11. This detection system supplies an electric signal which is modulated in conformity with the information stored in a track to be read. The detection system may supply signals representing deviations in the position of the radiation spot with respect to a track to be read and/or it may represent focusing errors as described in, for example, "Phillips Technical Review", Volume 40, No. 6, pages 151-155.

As is known, a polarization-sensitive splitting prism may alternatively be used as a beam splitter instead of a semi-transparent mirror. A birefrigent plate should then be arranged in the radiation path between this beam splitter and the objective, which plate ensures that the direction of polarization of the beam returning from the record carrier is rotated through 90° with respect to the direction of polarization of the beam emitted by the source.

In order that the information signal read from the record carrier has a sufficiently large modulation depth and that no crosstalk occurs between adjacent track portions, it must be ensured that the scanning spot keeps following the scanned track portion very accurately. To this end the position of the centre of the scanning spot with respect to the centre line of the track portion to be read must be determined at every moment and, if necessary, the position of the scanning spot must be corrected accordingly. According to the invention a linear diffraction grating 14 is arranged in the radiation path for generating a tracking error signal and the wavelength of the radiation source 7 is tunable.

Figure 2:
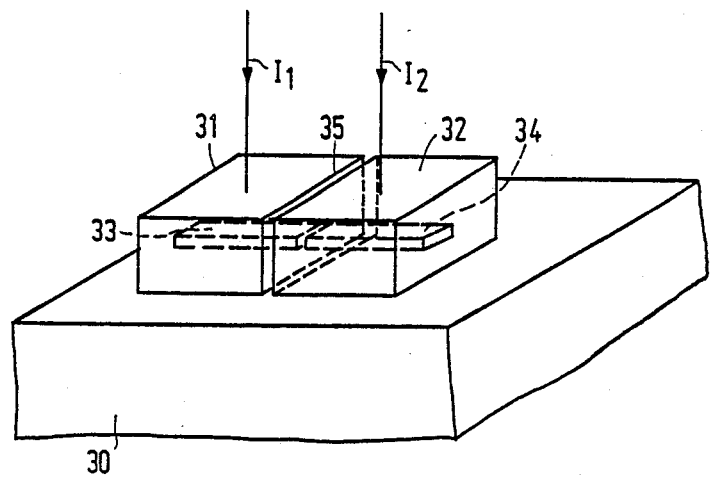
FIG. 2 shows diagrammatically an embodiment of a tunable radiation source.

An example of such a tunable radiation source is a semiconductor laser coupled to a resonant cavity ("Cleaved-Coupled-Cavity Semiconductor Laser"). FIG. 2 shows the principle of such a radiation source. The radiation source comprises two semiconductor diode structures 31 and 32 on a common cooling block 30. The diode structures comprise a plurality of semiconductor layers alternately of p and n-type and a so-called active strip 33, 34, respectively. Electric currents $I_1$ and $I_2$ are passed through these diodes via electrodes (not shown) on the upper and lower sides of the diode structures. The current $I_1$ is larger than the threshold current of the diode 31 so that laser radiation is generated in the active strip 33 of this diode. This laser radiation crosses the cleavage 35 separating the diodes electrically and enters the strip 34 of the diode 32. The current $I_2$ through the diode 32 is smaller than the threshold current for this diode so that no laser radiation is generated in the strip 34, but this strip operates as an external resonant cavity for the diode 31.

By varying the current $I_2$ a variation of the number of charge carriers in the strip 34 occurs so that the refractive index in this strip changes. Consequently, the optical path length of the external resonant cavity for the diode laser 31 changes, so that this laser is tuned to another wavelength. For further details about the radiation source according to FIG. 2 reference is made to the afore-cited Article in "Electronics Letters" (1983), Vol. 19, No. 9, pages 341-342 in which the use of this radiation source in an optical fibre communication system is described.

The tunable radiation source may alternatively be constituted by an assembly of a diode laser and a light-conducting layer integrated therewith and operating as a tuning resonant cavity. Its refractive index can be changed by changing an electric current through this layer. Such a composite radiation source for use in an optical multiplex system or in an optical heterodyne measuring system has been described in the Article "Wavelength Tuning of GaInAsP/InP Integrated Laser with Butt-Jointed Built-in Distribution Bragg Reflector" in "Electronics Letters" (1983), Vol. 19, No. 17, pages 656-657. In general, in the present invention a laser source may be used which is coupled to an external resonant cavity whose optical path length is continuously adjustable.

As is shown in FIG. 1, the grating strips 15 and 16 of the diffraction grating 14 are substantially parallel to the direction of a scanned track portion. In the plane XZ transversely to the direction of the grating strips the diffraction grating splits the incident beam b into a non-diffracted zero-order sub-beam, two sub-beams of the +1 order and −1 order, respectively, and a plurality of second and higher order sub-beams. The grating period $p_r$ and the angle of inclination $\alpha$ of the grating and the nominal wavelength of the laser beam are adjusted to one another in such a way that only one of the first or higher order sub-beams passes through the pupil of the objective 9. For the sake of clarity FIG. 1 shows only this one sub-beam $b_a$.

The diode laser itself of the said composite radiation source emits, at stable ambient parameters, a nominal wavelength, which is determined by the construction of the diode laser. A given diffraction angle of the first order, a given diffraction angle of the second order, etc., is associated with this wavelength.

By driving the external resonant cavity with an alternating current $I_2$, the wavelength of the laser beam is modulated around the nominal wavelength. The result is that the diffraction angle of the selected diffraction order is modulated around the nominal diffraction angle, in other words: the principal axis of the selected beam periodically oscillates around its nominal direction. Consequently, the position of the radiation spot S formed by the objective 9 oscillates around an average position which must coincide with the centre line of the scanned track portion. It is ensured that the amplitude of the periodical spot displacement, or spot wobble, it is considerably smaller than the track width, for example, 1/30 of this width. The frequency of the spot wobble is small, for example, several tens of kHz as compared with the frequency of the information to be read, which is, for example, of the order of several MHz.

Due to the periodical displacement of the scanning spot with respect to the scanned track portion which is optically distinguished from its ambiance, for example, because it diffracts the incident radiation, the intensity of the beam reflected by the record carrier is periodically modulated. The output signal $S_d$ of the detector 11 then not only comprises a high-frequency AC component with a relatively large amplitude representing the information which has been read, but also a component of a lower frequency with a small amplitude. This amplitude and the phase of the low-frequency component represent the magnitude and the direction of a deviation between the centre of the scanning spot and the centre line of the track portion which has been read. If the centre of the scanning spot S coincides with the centre line of the track portion, the frequency of the low-frequency component in the detector system $S_d$ is equal to twice the frequency with which the scanning spot is oscillated. In the case of a deviation of this position the frequency of the low-frequency component is equal to that of the scanning spot wobble, whilst the phase of this component is equal to or is shifted 180° with respect to the phase of the signal with which the scanning spot wobble is realized, dependent on whether the centre of the radiation spot is situated to the left or to the right of the centre line of the scanned track portion.

Figure 3:
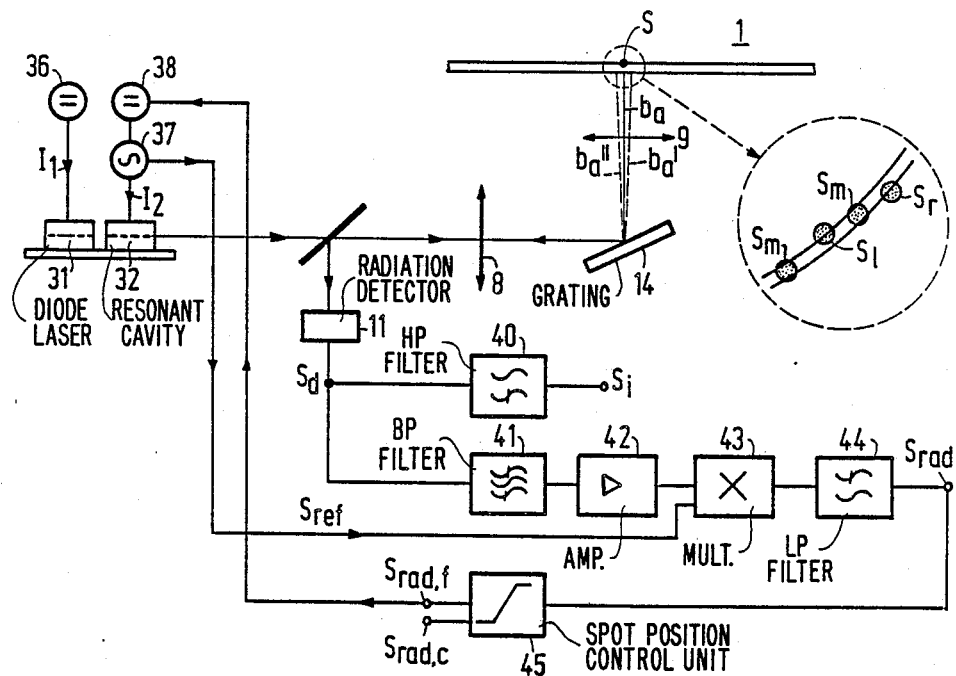
FIG. 3 shows the principle of generating the tracking error signal according to the invention.

FIG. 3 illustrates the principle of generating the tracking error signal. The elements corresponding to those of FIG. 1 have the same reference numerals. The diode laser 31 is controlled by a DC source 36 supplying a current $I_1$ which is larger than the threshold current. The resonant cavity 32 is connected to an AC source 37 and possibly to a DC source 38. The alternating current $I_2\sim$ ensures that the direction of the selected-order beam $b_a$ changes periodically, as is diagrammatically indicated by means of the broken lines $b_a'$ and $b_a''$. The scanning spot wobble produced thereby is diagrammatically shown in the inset in FIG. 3.

The output signal $S_d$ of the detector 11 not only comprises the high-frequency information signal $S_i$, which is passed by a high-pass filter 40 and is subsequently processed in known manner, but also a low-frequency component. This component passes a bandpass filter 41 and possibly an amplifier 42. Subsequently this component is synchronously detected by means of a reference signal $S_{ref}$ which has the same phase as the scanning spot wobble and is taken from, for example, the source 37. This detection implies that the low-frequency component is multiplied in element 43 by the reference signal and that the resultant signal is passed through a low-pass filter 44. The tracking error signal $S_{rad}$ is produced at the output of filter 44, with which the position of the radiation spot S can be corrected by means of a control unit 45.

This correction could be effected by control unit 45 in a conventional manner, for example, by tilting or displacing an element which is already present in the radiation path or which has been especially arranged for this purpose.

The signal $S_{rad}$ is preferably split into a high-frequency fine control component $S_{rad,f}$ with which a fast control over a smaller range can be realized, and a low-frequency component $S_{rad,c}$ with which a slower control over a larger range can be realized and which may compensate, for example, for a possible eccentricity of the track turns. The last-mentioned control may be, for example, a displacement in the radial direction of a sledge on which the optical components of the read apparatus have been arranged. The fine-control may be, for example, a tilting of the diffraction grating through a small angle.

According to one aspect of the present invention the fine positioning of the scanning spot is realized electro-optically without using moving elements, as is shown in FIG. 3. Therein, the DC control current $I_2$ is set by control unit 45 to a new value by means of the signal $S_{rad,f}$ so that the nominal wavelength to which the laser beam is tuned by resonant cavity 32 acquires a different value. The result is that the position of the scanning spot, the central position $s_m$ in the inset in FIG. 3, is shifted in such a way that the centre of this spot coincides again with the centre line of the scanned track portion if the spot had previously been off-centre with respect to this track portion.

The tracking error signal for electro-optically correcting the spot position may alternatively be obtained in a manner which differs from that described with reference to FIG. 3. For example, the method described in U.S. Pat. No. 3,876,842 may be used. In that method, with the aid of extra radiation sources or with a beam splitter, two extra radiation spots are generated which are projected on the two edges of the scanned track portion. A separate detector is added for each of these radiation spots and the difference between the output signals of these detectors represents the tracking error signal. This signal may alternatively be generated with the scanning beam itself by arranging two radiation-sensitive detectors in the path of this beam from the record carrier, the bounding line between these detectors being parallel to the track direction, and by comparing the output signals of these detectors as described, for example, in U.S. Pat. No. 4,423,496.

The wavelength of the radiation source may not only be tuned or modulated in the manner described above, but also in other manners. If the tuning need not be very fast, the wavelength may be tuned to a different value, for example, by variation of the temperature of a diode laser by means of, for example, a Peltier element.

The diffraction grating may be a radiation transmitting grating. However, as is shown in FIG. 1, this grating is preferably a reflection grating reflecting the beam b at an angle of 90°. The greater part of the radiation path then extends horizontally so that the mounting height of the read apparatus is small. The advantage of the use of a grating as a reflector is that the angle of inclination $\alpha$ of the grating is smaller than 45° because one of the higher order beams is used as a scanning beam, so that this grating only requires little space in the vertical direction. Consequently, the mounting height of the scanning apparatus can be further reduced. This is particularly important for scanning apparatus which are intended to be built into optical disc players for consumer use, which players are portable or which must be built into motor cars. A small mounting height is also very desirable when using the scanning apparatuses as scanning heads for an optical disc memory which, analogously as a magnetic disc memory, has a plurality of optical memory discs each of which are scanned with one or two separate scanning head(s).

A diode laser is preferably used as a radiation source in read and/or write apparatus for disc-shaped optical record carriers. As is known, the beam emerging from the front side 23 of a diode laser 7 is not symmetrical. The aperture angle of this beam in the lateral plane, the plane XZ parallel to the active strip, is considerably smaller than the angle of aperture in the transversal plane, the plane XY transversely to the active strip, as is shown in FIG. 1. In this Figure the boundary rays of the beam in the lateral plane are denoted by solid lines and the boundary rays of the beam in the transversal plane are denoted by broken lines. At the area of the collimator lens 8 the beam b has an elliptical cross-section. To obtain a round radiation spot S on the information surface 3, the beam has to be reshaped into a beam having a round cross-section.

As is shown in FIG. 1, the desired beam shaping can be realized by means of the diffraction grating 14 at a small angle of inclination $\alpha$ or a large angle of incidence $\gamma$. Since the chief ray h of the beam b in the lateral plane extends at a small angle $\alpha$ to the reflective surface 14, whereas the beam $b_a$ is reflected substantially in the vertical direction, the last-mentioned beam in the lateral plane is considerably widened with respect to the incident beam b. While adapting the period $P_r$ of the grating, the angle of inclination $\alpha$ may be chosen to be such that the lateral width of the beam, after reflection on the grating, is equal to the transversal width which is not changed by the grating.

In the apparatus according to FIG. 1 the mounting height is simultaneously reduced by means of the grating 14 and the beam in the lateral plane is widened. However, it is alternatively possible to use the diffraction grating for fulfilling only one of these requirements.

Hitherto, the invention has been described with reference to a read apparatus. However, the invention may alternatively be used in an apparatus for writing a record carrier with optical radiation, which carrier is provided with a previously arranged and optical detectable servo track used to cause a write radiation spot to follow an accurately determined path. Such a write apparatus principally has the same structure as the read apparatus. However, the scanning beam must then be modulated with the information to be written. This can be realized by means of an optical modulator arranged in the radiation path or by controlling the diode laser by means of a control signal which is modulated in conformity with the information to be written.

The diffraction grating is preferably arranged on a triangular prism the other two surfaces of which are denoted by 17 and 18 in FIG. 1. The angle $\beta$ between the surfaces 17 and 18 is preferably 90°, which facilitates alignment and mounting of the grating.

The diffraction grating may be an amplitude grating and may comprise reflective strips 15 and absorbing or radiation-transmitting strips 16. However, the diffraction grating is preferably a phase grating. Such a grating yields a higher diffraction efficiency than an amplitude grating. The phase grating may be in the form of a so-called profile grating comprising, for example, grating grooves 15 and higher located grating strips 16, as is shown in FIG. 4. Such a grating has the advantage that it can be manufactured in bulk quantities at low cost by means of known pressing and replica techniques if a mould in which the grating structure is provided is available. Such a mould need only be manufactured once.

The phase grating may alternatively be constituted by a structure of juxtaposed strips alternately having a first and a second refractive index. This structure may have the shape of a so-called volume hologram or thick hologram having a thickness of the order of several mm:s. Such a hologram is obtained by causing two beams to be incident on a thick plate of special photographic material. Dependent on whether a reflection or volume hologram is to be obtained, the beams must be incident on different sides or on the same side of the plate. Within this plate the beams interfere with one another so that a structure of juxtaposed strips alternatively having a high and low intensity is produced. By developing the plate the intensity pattern is converted into a pattern of strips having higher and lower refractive indices. FIG. 5 shows such a volume hologram 14' in a diagrammatic cross-section.

The difference $\Delta n$ between the refractive index $n_1$ of the strips 15' and the refractive index $n_2$ of the strips 16' is, for example, 0.02 and n and $n_2$ have values of, for example, 1.52 and 1.54, respectively. In most cases the strips will extend at an angle $\phi$ deviating from 90° to the two sides 25 and 26 of the plate 14'.

Moreover, the transitions between the areas having different refractive indices will generally not be so abrupt in practice as is shown in FIG. 5, but the refractive index has a more gradual variation as is shown in FIG. 5a. In this Figure the position e on the plate, transversely to the strips of FIG. 5, is plotted horizontally and the refractive index n is plotted vertically.

The beam $b_a$ passing through the objective may be one of the first-order sub-beams. These sub-beams have of themselves a higher intensity than the higher order sub-beams. For a sub-beam of the order m diffracted by a diffraction grating it holds that the sine of the diffraction angle δ is proportional to $(\lambda \cdot m)/p_r$. If a sub-beam of, for example, the second order is chosen for the sub-beam $b_a$, the period $p_r$ of the grating 14 is twice as large at the same diffraction angle δ than when choosing a sub-beam of the first order. Under these circumstances it is therefore preferable to choose a second or higher order sub-beam because the diffraction grating can then be manufactured more easily with the required accuracy.

In the case of selecting a second or higher diffraction order sub-beam as well as in the case of selecting a first-order sub-beam, the efficiency of the grating for the selected sub-beam can be enhanced by adapting the grating parameters. The efficiency is herein understood to mean that part of the radiation intensity indicent on the grating which is diffracted in the selected order. In the case of a profile grating the said parameters are the depth of the grating grooves 15, the wall steepness of these grooves and the radio between the width of the grooves 15 and those of the intermediate grooves 16. Optimizing the grating parameters of a profile grating is known as "blazing". FIG. 6 shows a small part of an embodiment of such a "blazed" grating 14'' in a simplified form. It has been ensured, inter alia, that the parts of the incident radiation beam $b_a$ are incident as much as possible on areas 16'' reflecting the radiation in the desired direction.

Also for a refractive index grating, like a volume hologram according to FIGS. 5 and 5a, the efficiency for the selected diffraction order can be maximized by an optimum choice of the difference Δn in refractive index, the angle of inclination φ of the strips and the ratio between the widths of the strips 15' and 16'. Although the beam is diffracted, it can be assumed in a first approximation that the optimization of the diffraction grating implies, inter alia, that the grating areas on which the beam parts are incident have such a direction that they reflect the radiation in the desired direction.

If the wavelength-tunable radiation source and the diffraction grating are only used for generating the scanning spot wobble with a small amplitude, at which the wavelength variation is also very small, and if it is not used for correcting the average scanning spot position, the scanning apparatus may be considerably simplified. In fact, it is then possible to use a diffraction grating with a built-in lens power so that a separate collimator lens and an objective are no longer necessary. Such a grating has curved grating lines and a varying grating period.

Figure 7:
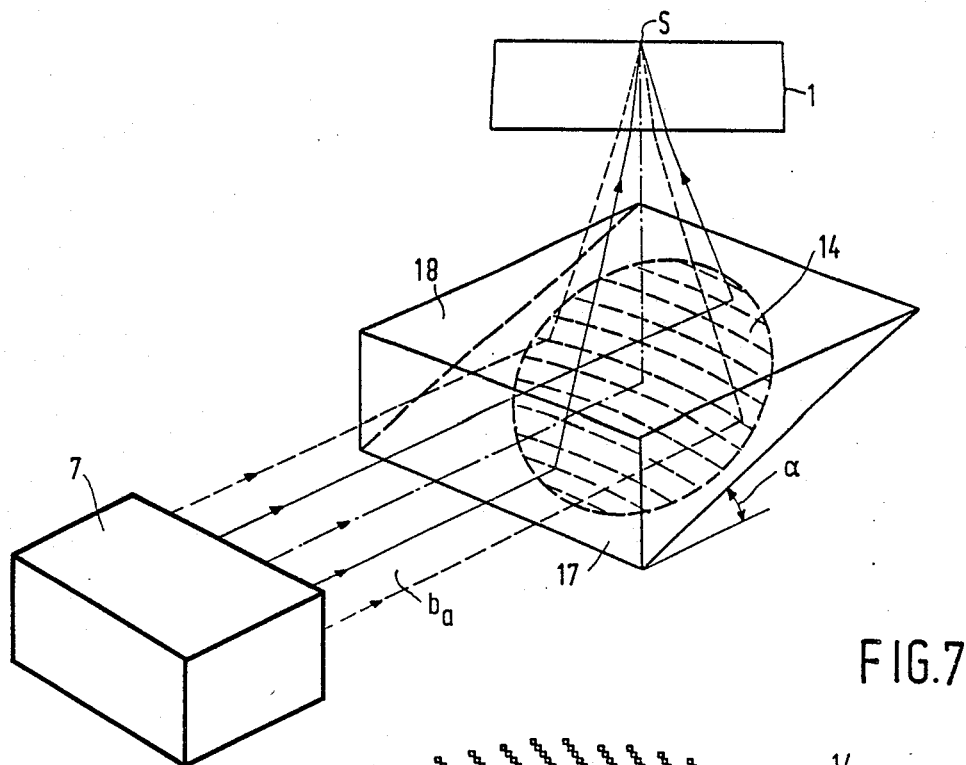
FIG. 7 is a perspective view of an embodiment of the scanning apparatus comprising a diffraction grating having a lens action.
Figure 8:
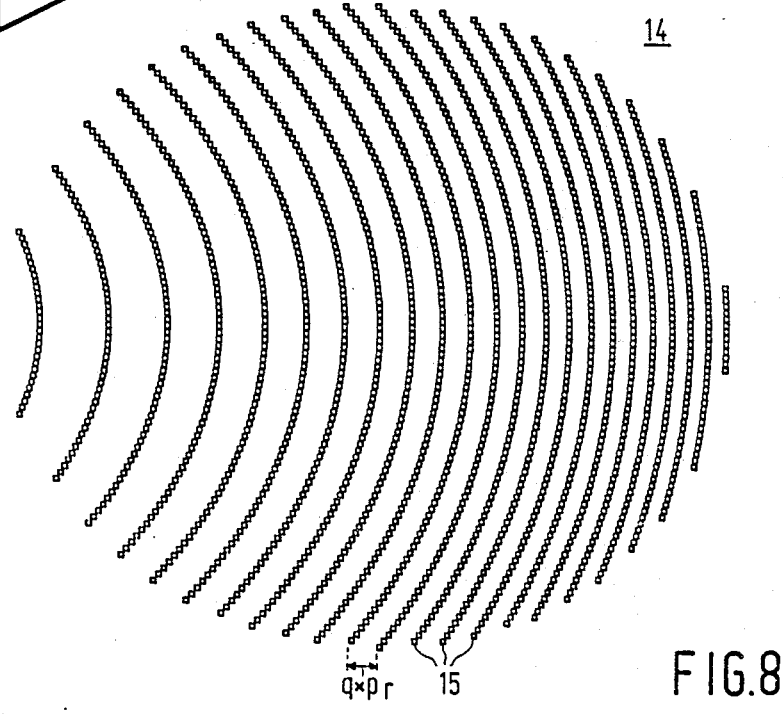
FIG. 8 is a front elevation of this grating and FIG. 9 is a lateral cross-section of an embodiment of the scanning apparatus comprising a prism having a curved surface and a linear grating.

FIG. 7 shows the simplified scanning apparatus in a diagrammatical form. FIG. 8 shows the diffraction grating in a front elevation. The radius of curvature of the grating strips 15 uniformly increases in one direction. The grating period $P_r$ uniformly decreases in the same direction. In FIG. 8 only one grating strip 15 is shown each time over a number of (q) grating periods. The distance between the curved strips 15 in FIG. 8 is thus equal to $q \times P_r$. The grating according to FIG. 8 may be manufactured, for example, holographically by exposing a plate of holographic material at the position of the grating with a diverging beam from a point source at the position of a scanning spot S and a beam corresponding to the beam b, and by developing this plate. This grating is therefore also referred to as a holographic (grating) objective.

Due to the absence of an objective, the embodiment of a scanning apparatus as shown in FIG. 7 has a very low mounting height. Moreover, this apparatus may be very light. The positioning of the scanning spot may therefore be established with the desired speed and accuracy by displacing a holder in which the elements 7 and 14 are arranged.

Also when using a linear grating, that is to say, a grating having straight grating strips and a constant grating period the apparatus can be simplified and its height can be reduced by integrating the objective with the prism in which the grating is arranged.

Figure 9:
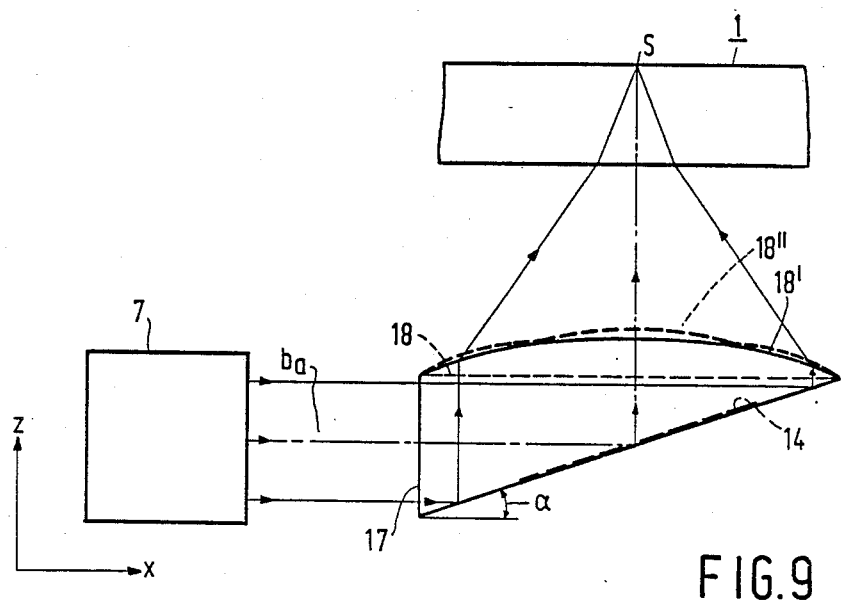

FIG. 9 shows a first embodiment of such an integrated element. This Figure shows in a lateral cross-section a triangular prism having a straight angle, with the diffraction grating 14 being arranged on its oblique side. The prism is differently oriented in FIG. 9 than the prism in FIG. 1, namely in such a way that the beam $b_a$ enters the prism via the surface 17 and leaves the prism via the surface 18' after reflection by the grating. This exit face is not a flat face like surface 18 of FIG. 1 but a curved face which has a lens action due to its curvature and may therefore replace the objective 9 of FIG. 1.

As described in, inter alia, U.S. Pat. No. 4,668,066 the objective in a scanning apparatus for disc-shaped record carriers may comprise a single lens element. However, this element must have at least one aspherical surface in order to be able to form a scanning spot which is free from aberration. Such a correction will also have to be introduced in the objective diffraction grating element of FIG. 6. This can be realized by giving the curved surface an aspherical shape 18'', as denoted by the broken-line curve, instead of a spherical shape 18'.

What is claimed is:

1. An apparatus for scanning information recording tracks on an optical record carrier, comprising:
    a radiation source for supplying a scanning beam which is tunable to different wavelengths;
    an imaging optical system for forming said scanning beam into a scanning spot on a recording track to be scanned, said optical system comprising a diffraction grating positioned in the path of said scanning beam between said radiation source and said recording track for diffracting the beam so that only a selected higher diffraction order sub-beam thereof is formed into said scanning spot, the diffraction angle of said selected sub-beam being dependent on the wavelength of said scanning beam; and
    tuning control means coupled to said radiation source for controlling the wavelength of said scanning beam produced thereby, thereby controlling the diffraction angle of said selected sub-beam and the position of said scanning spot in relation to said recording track.

2. An apparatus as claimed in claim 1, characterized in that said radiation source comprises a semiconductor diode laser and a light-conducting semiconductor element optically coupled thereto for providing a resonant tuning cavity for radiation produced by said laser.

3. An apparatus as claimed in claim 1 or 2, characterized in that said tuning control means supplies a DC control signal to said radiation source of a magnitude and polarity corresponding to a tracking error between said scanning spot and said recording track, said control signal controlling the wavelength of said radiation beam so that said scanning spot remains centered on said recording track.

4. An apparatus as claimed in claim 1 or 2, characterized in that said tuning control means supplies an AC control signal to said radiation source for periodically varying the wavelength of said radiation beam about an average value, and further comprising an opto-electronic detection circuit for providing synchronous detection of radiation produced by said scanning spot from said recording track, said detection circuit being synchronized by a reference signal from said control means having a frequency equal to that of the periodic variation of the wavelength of said radiation beam.

5. An apparatus as claimed in claim 1 or 2, characterized in that said diffraction grating also has objective lens power for focusing said selected diffraction order sub-beam of said scanning beam into said scanning spot.

6. An apparatus as claimed in claim 1 or 2, characterized in that said diffraction grating is a reflective grating positioned so that the angle between the normal thereto and the central ray of said scanning beam incident thereon exceeds 45° and is less than 90°.

7. An apparatus as claimed in claim 2, characterized in that said diode laser has an active layer emitting a radiation beam having (i) a first aperture angle in the lateral plane through the principal axis of said beam and parallel to said active layer, and (ii) a second aperture angle in the transverse plane through said principal axis and transverse to said active layer; said first aperture angle being smaller than said second aperture angle, and said diffraction grating comprising grating strips extending in a direction transverse to said lateral plane.

8. An apparatus as claimed in claim 1 or 2, characterized in that said diffraction grating is a phase grating.

9. An apparatus as claimed in claim 8, characterized in that said phase grating is a profile grating.

10. An apparatus as claimed in claim 8, characterized in that said phase grating is a volume grating comprising a plurality of juxtaposed strips altlernately having a first average refractive index and a second average refractive index.

11. An apparatus as claimed in claim 1 or 2, characterized in that said diffraction grating has grating parameters which determine the intensity distribution of different diffraction order sub-beams of the diffracted scanning beam, and said parameters are selected so that a maximum percentage of the intensity of the scanning beam incident on said diffraction grating is comprised in said selected diffraction order sub-beam of said scanning beam.

12. An apparatus as claimed in claim 1 or 2, characterized in that said selected diffraction order sub-beam of said scanning beam is a first diffraction order thereof.

13. An apparatus as claimed in claim 1 or 2, characterized in that said selected diffraction order sub-beam of said scanning beam is a second or higher diffraction order thereof.

14. An apparatus as claimed in claim 1 or 2, characterized in that said diffraction grating is a triangular prism having an oblique surface and two other mutually perpendicular surfaces, one of said other two surfaces being perpendicular to the scanning beam from said radiation source and the second of said other two surfaces being perpendicular to the diffracted scanning beam which is directed from said diffraction grating towards said record carrier.

15. An apparatus as claimed in claim 14, characterized in that said second surface of said prism is curved.

16. An apparatus as claimed in claim 15, characterized in that said curved second surface of said prism is aspherical and said diffraction grating is a linear grating.

17. An apparatus as claimed in claim 15, characterized in that said curved second surface of said prism is spherical and said diffraction grating has an abberation-correcting aspherity.

* * * * *